US012661652B2

(12) United States Patent
Loane

(10) Patent No.: US 12,661,652 B2
(45) Date of Patent: Jun. 23, 2026

(54) INK FORMULATIONS FOR PRINTING AND MANUFACTURE OF REACTIVE CHEMICAL SENSORS

(71) Applicant: Veriteque USA, Inc., Carson City, NV (US)

(72) Inventor: Christian Loane, Carson City, NV (US)

(73) Assignee: Veriteque USA, Inc., Carson City, NV (US)

( * ) Notice: Subject to any disclaimer, the term of this patent is extended or adjusted under 35 U.S.C. 154(b) by 1009 days.

(21) Appl. No.: 17/770,626

(22) PCT Filed: Oct. 22, 2020

(86) PCT No.: PCT/US2020/056855
§ 371 (c)(1),
(2) Date: Apr. 21, 2022

(87) PCT Pub. No.: WO2021/081199
PCT Pub. Date: Apr. 29, 2021

(65) Prior Publication Data
US 2022/0355291 A1 Nov. 10, 2022

Related U.S. Application Data

(60) Provisional application No. 62/924,334, filed on Oct. 22, 2019.

(51) Int. Cl.
B01L 3/00 (2006.01)
B41M 3/00 (2006.01)
(Continued)

(52) U.S. Cl.
CPC ............. B01L 3/505 (2013.01); B41M 3/006 (2013.01); C09D 11/033 (2013.01);
(Continued)

(58) Field of Classification Search
CPC ................. B01L 3/505; B01L 2200/16; B01L 2300/069; B41M 3/006; C09D 11/033;
(Continued)

(56) References Cited

U.S. PATENT DOCUMENTS 6,613,576 B1 9/2003 Rodacy et al.
8,252,602 B2 8/2012 Haas
(Continued)

OTHER PUBLICATIONS

Song-im et al., Evaluation of different sampling media for their potential use as a combined swab for the collection of both organic and inorganic explosive residues, Forensic Science International, vol. 222, Issues 1-3, 2012, pp. 102-110, ISSN 0379-0738, https://doi.org/10.1016/j.forsciint.2012.05.006.*
(Continued)

*Primary Examiner* — Brian R Gordon
(74) *Attorney, Agent, or Firm* — Gavrilovich, Dodd & Lindsey LLP

(57) ABSTRACT

Provided herein, inter alia, are solvent and resin formulations comprising reduced fire and environmental risk, methods for producing sensor device for detection of any analyte, e.g., by printing reactive chemicals and dyes onto a substrate using large scale printing machines. Also provided is a method of preparing the reduced risk formulations and sensor device, and methods of using the sensor device. Further provided is a sensor system including an ink and a solid support. The ink includes at least one reactive chemical or dye, a co-solvent, and a resin composition chosen for reduced fire and environmental impact risk. The ink is applied (e.g., printed) on a surface of the solid support. The reactive chemical or dye is configured to undergo a chemical reaction with gunshot residue (e.g., post blast residues associated with historical and modern day black powders used in bullet manufacture) that produces a presumptive colorimetric indication.

11 Claims, 2 Drawing Sheets

Solid support substrate

Printed / dried reactive chemicals / dyes – test zones

Swab

(51) Int. Cl.

| | |
|---|---|
| *C09D 11/033* | (2014.01) |
| *C09D 11/037* | (2014.01) |
| *C09D 11/106* | (2014.01) |
| *C09D 11/322* | (2014.01) |
| *C09D 11/328* | (2014.01) |

(52) U.S. Cl.

CPC .......... *C09D 11/037* (2013.01); *C09D 11/106* (2013.01); *C09D 11/322* (2013.01); *C09D 11/328* (2013.01); *B01L 2200/16* (2013.01); *B01L 2300/069* (2013.01)

(58) Field of Classification Search

CPC ... C09D 11/037; C09D 11/106; C09D 11/322; C09D 11/328; C09D 11/14; C09D 11/50

See application file for complete search history.

(56) References Cited

U.S. PATENT DOCUMENTS

| | | | | |
|---|---|---|---|---|
| 10,024,834 | B2 * | 7/2018 | Gorski | ................. G01N 33/227 |
| 10,330,603 | B1 * | 6/2019 | Callahan | ................ G01N 21/78 |
| 10,746,717 | B2 * | 8/2020 | Gorski | ................. G01N 31/228 |
| 2009/0029480 | A1 | 1/2009 | Loane | |
| 2010/0140916 | A1 * | 6/2010 | Firth | ......................... C09C 1/62 |
| | | | | 427/508 |
| 2015/0316483 | A1 | 11/2015 | Deans et al. | |
| 2016/0077013 | A1 | 3/2016 | Attar et al. | |
| 2017/0082550 | A1 | 3/2017 | Callahan | |
| 2018/0113107 | A1 | 4/2018 | Gorski | |
| 2018/0299421 | A1 * | 10/2018 | Gorski | ................. G01N 33/227 |
| 2020/0115576 | A1 * | 4/2020 | Kodama | .................. B41M 5/00 |
| 2023/0349872 | A1 * | 11/2023 | Loane | ...................... G01N 1/02 |

OTHER PUBLICATIONS

International Search Report and Written Opinion corresponding to International Patent Application No. PCT/US2020/056855, dated Mar. 9, 2021 (12 pages).

* cited by examiner

Solid support
substrate

Printed / dried reactive
chemicals / dyes – test zones

Swab

INK FORMULATIONS FOR PRINTING AND MANUFACTURE OF REACTIVE CHEMICAL SENSORS

CROSS-REFERENCE TO RELATED APPLICATIONS

This application is a U.S. National Stage application of International Patent Application No. PCT/US2020/056855, filed Oct. 22, 2020. International Patent Application No. PCT/US2020/056855 claims the benefit of U.S. Provisional Patent Application No. 62/924,334, filed on Oct. 22, 2019 and entitled "Improved Ink Formulations For Printing and Manufacture Of Reactive Chemical Sensors," the entirety of each of these applications is incorporated by reference.

FIELD

Embodiments of the present disclosure relate to a solvent and resin formulations for printing and manufacture of reactive chemical sensors.

BACKGROUND

Printing reactive chemicals, chromic dyes and stains to produce sensor devices has been practiced for decades and has advanced in recent times with a better understanding in the chemistry and interactions of ink formulations with reactive chemicals and dye's. Advances in precision printing equipment and methodology has also improved sensor development.[1][2]

Many problems exist in relation to successfully print reactive chemicals and dyes to a substrate, for use as a sensor device. The ink formulations for the most part utilise hazardous chemicals, combustible polymers and solvents. Furthermore the industry as a whole produces large volumes of hazardous waste, which has significant environmental impact risks. In particular, the "inks" used, are hazardous and the use of inks presents occupational health issues and the disposal of inks poses significant environmental risks.[3][4] Thus, new methods for printing are needed.

SUMMARY

Provided herein, inter alia, are sensor systems methods of manufacture that are configured to detect, for example, gunshot residue (e.g., on surfaces post discharge of a fire arm). As discussed in greater detail below, embodiments of the sensor system possess reduced fire and environmental impact risk, while also achieving minimal interactions between reactive chemicals and dyes used in the sensor system. A method of using the sensor system is also provided herein.

The sensor system includes an ink and a solid support. The ink includes at least one reactive chemical or dye, a co-solvent or thinner, and a resin composition chosen for reduced fire and environmental impact risk. The ink is applied (e.g., printed) on a surface of the solid support. The at least one reactive chemical or dye is configured to undergo a chemical reaction with gunshot residue (e.g., post blast residues associated with historical and modern day black powders used in bullet manufacture) that produces a presumptive colorimetric indication.

In an embodiment, at least two different inks are present on the surface of the solid support and spaced apart from each other.

In an embodiment, the solid support is formed from a material selected from the group consisting of glass, metal, paper, textiles, organic, and inorganic membranes.

In an embodiment, the co-solvent reduces fire risk due to azeotroping water molecules with organic alcohol molecules thus increasing the flashpoint and reducing fire risk and environmental impact risk due to the presence of water.

In an embodiment, the co-solvent is configured to solubilize the resin to produce a fluid which is suitable to both solubilize and/or disperse the reactive chemicals or dyes to thereby homogenize the ink.

In further embodiments, the co-solvent minimizes interaction with and degradation of the reactive chemicals or dyes which provide the presumptive colorimetric indication.

In certain embodiments, the co-solvent includes water and an alcohol (e.g., isopropyl alcohol). In further embodiments, the co-solvent consists essentially of water and isopropyl alcohol.

In an embodiment, a ratio of water:isopropyl alcohol is about 50%:50% by weight or volume.

In an embodiment, the resin is configured to minimize interaction with and degradation of the reactive chemical or dye which provide the presumptive colorimetric indication.

In an embodiment, the resin is selected from the group consisting of cellulose, polyvinyl alcohol (PVA), or polyvinylpyrollidone (PVP).

In an embodiment, the resin is PVA.

In an embodiment, the reactive chemical or dye is selected from the group consisting of the n-1 naphthyl ethylenediamine dihydrochloride, nano or powdered zinc, sulfamic acid, sulfanilamide.

In an embodiment, the at least one reactive chemical or dye is n-1 naphthyl ethylenediamine dihydrochloride and a ratio of the at least one reactive chemical or dye with the co-solvent and the resin is 10:60:30.

In an embodiment, the at least one reactive chemical or dye is sulfamic acid and a ratio of the at least one reactive chemical or dye with the co-solvent and the resin is 6:70:24).

In an embodiment, the reactive chemical or dye includes powdered zinc and sulfanilamide, and a ratio of the at least one reactive chemical or dye with the co-solvent and the resin is 2:8:70:20.

In an embodiment, a kit is provided that includes the sensor system, a swab that is pre-wetted with a liquid, and a container. The container hermetically seals the sensor system and the wetted swab in respective compartments that are separated from one another.

In an embodiment, the swab is pre-wetted with water.

In an embodiment, the packaging is PET12 µm/AL7 µm/PE50.

In an embodiment, method of fabricating a sensor system is provided. The method includes preparing an ink mixture, printing the ink mixture on a solid support, and drying the ink mixture. The ink mixture includes a reactive chemical or dye, a co-solvent including an aqueous solvent and an organic solvent, and a resin. The reactive chemical or dye is configured to undergo a chemical reaction with gunshot residue that produces a presumptive colorimetric indication.

In an embodiment, the method further includes, prior to printing the ink mixture, mixing the reactive chemical or dye, the co-solvent, and the resin by mechanical shaking or mixing to produce a homogenized ink.

In an embodiment, printing the ink includes printing the ink mixture on the solid support structure a two positions separated from one another.

In an embodiment, printing the ink includes at least one of letterpress, rotary gravure, rotary screen printing, flat screen printing, tampography, wax printing, contact dosing, ultrasonic sputter, flexographic, or spray or drop on demand printing.

In an embodiment, the method further includes guillotine or stamp cutting or shaping the solid support after printing the ink.

In an embodiment, the ink mixture is dried by heated air flow, removal of exhaust gases removed with HVAC, and scrubber removal of at least one of $NO_x$, $CO_x$, or fume.

In an embodiment, the solid support is formed from a material selected from the group consisting of glass, metal, paper, textiles, organic, and inorganic membranes.

In an embodiment, the co-solvent includes water and an alcohol (e.g., isopropyl alcohol). In further embodiments, the co-solvent consists essentially of water and isopropyl alcohol.

In an embodiment, a ratio of water:isopropyl alcohol is about 50%:50% by weight or volume.

In an embodiment, the resin is selected from the group consisting of cellulose, polyvinyl alcohol (PVA), or polyvinylpyrrolidone (PVP).

In an embodiment, the resin is PVA.

In an embodiment, the reactive chemical or dye is selected from the group consisting of the n-1 naphthyl ethylenediamine dihydrochloride, nano or powdered zinc, sulfamic acid, sulfanilamide.

In an embodiment, the at least one reactive chemical or dye is n-1 naphthyl ethylenediamine dihydrochloride and a ratio of the at least one reactive chemical or dye with the co-solvent and the resin is 10:60:30.

In an embodiment, the at least one reactive chemical or dye is sulfamic acid and a ratio of the at least one reactive chemical or dye with the co-solvent and the resin is 6:70:24).

In an embodiment, the reactive chemical or dye includes powdered zinc and sulfanilamide, and a ratio of the at least one reactive chemical or dye with the co-solvent and the resin is 2:8:70:20.

In an embodiment, a method of fabricating a sensor kit is provided. The method includes receiving the sensor system, wetting a swab with a liquid, and a packaging the sensor system and the wetted swab in a container.

In an embodiment, packaging the sensor system and the wetted swab includes hermetically sealing the sensor system and the wetted swab in respective compartments that are separated from one another.

In an embodiment, the swab is wetted with water.

In an embodiment, the container is formed from PET12 μm/AL7 μm/PE50.

In an embodiment, a method using the sensor system to presumptively identify gunshot residue on surfaces. A wetted swab (e.g., wetted with water) is used to transfer gunshot residue from a surface to the sensor system. The wetted swab with gunshot residue is contacted with the sensor system to mix the ink mixture and the gunshot residue to facilitate a presumptive colorimetric indication of the gunshot residue.

In another embodiment, a method is provided for using the sensor system for identifying gunshot residue by presumptive colorimetric indication.

In embodiments, the method can include removal of the pre-wetted swab and sensor device strip from the packaging of the kit. The method can also include identifying a gunshot residue sample surface. The method can further include rubbing the surface with the pre-wetted swab. The method can also include transferring said sampled swab to the sensor device strip and rubbing the sampled swab onto portions of the solid support structure including the printed ink mixture for several second to facilitate a presumptive colorimetric indication for post blast gunshot residue.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Other aspects of the invention are disclosed infra.

BRIEF DESCRIPTION OF THE DRAWINGS

Other objectives of the disclosed embodiments will appear in the description and claims, with reference being made to the accompanying drawings, which form part of the specification.

DETAILED DESCRIPTION

Figure 1:
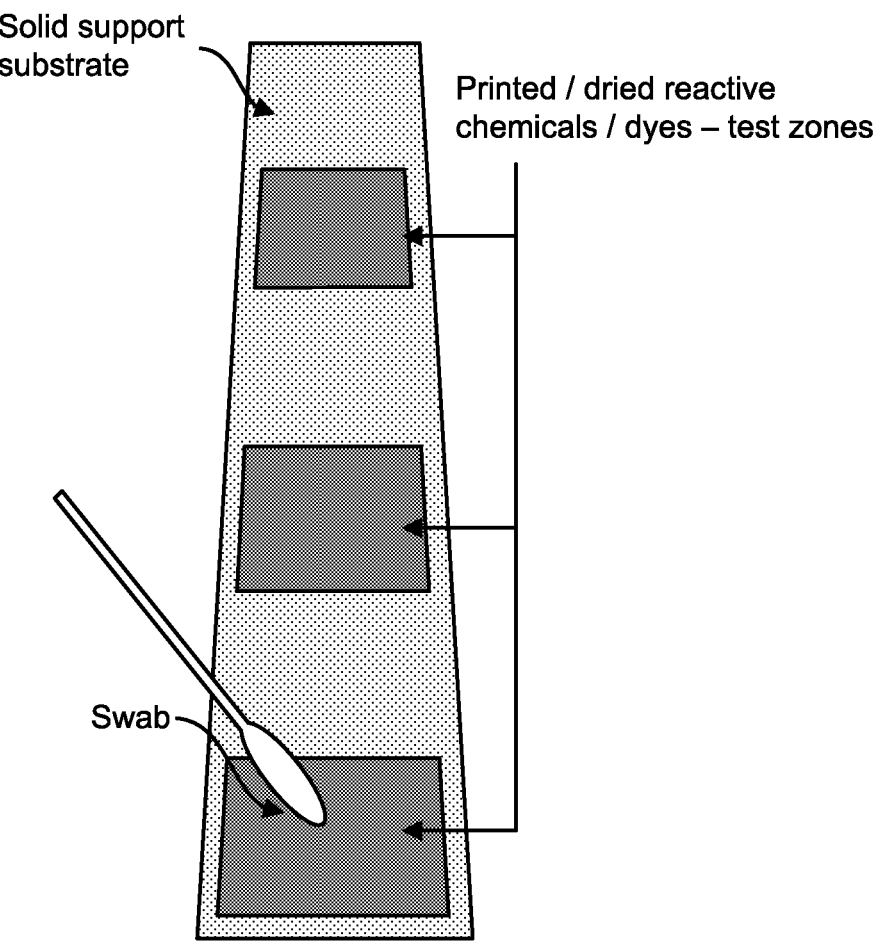
FIG. 1 illustrates a top view of one embodiment of a sensor system of the present disclosure including printed reactive chemicals and/or dyes dried and adhered to the surface of a solid support substrate. Also shown is a pre-wetted swab capable of collecting sample residue and transferring said residue to the surface of the sensor, rubbing swab tip into printed test zones, mixing analyte with reactive chemicals or dyes thus facilitating a presumptive colorimetric reaction, in the presence of for example gunshot residue.

Provided herein, inter alia, are compositions and methods that identify solvent thinners and resins with reduced fire and environmental impact risk, while also achieving minimal interactions between reactive chemicals and/or dyes used in a sensor system designed to detect for example, gunshot residue on target surfaces (e.g. a firearm surface post discharge). A method of producing the sensor system and a method of using the sensor system is also provided herein.

The sensor system includes at least one reactive chemical and/or dye, and one solvent or thinner and one resin composition chosen for reduced fire and environmental impact risk, applied to a solid support. As discussed in greater detail below, the sensor system can be further packaged in a kit with a swab. The sensor system produces a presumptive colorimetric indication in the presence of common post blast residues associated with historical and modern day black powders used in bullet manufacture.

Embodiments of the disclosure provide a method for selecting suitable solvent, thinner and resin composition for printing a sensor device, for identifying the presence of a target molecule or ion, which have reduced fire and environmental impact risk, while minimizing interaction and degradation of reactive chemicals and dyes required for colorimetric indication of analyte compounds.

Embodiments of the present disclosure provides a method for mixing said solvent, thinner, resin, reactive chemicals and dyes required for colorimetric indication of analyte compounds, to produce and ink which is printed onto the solid support structure. Printing can be performed using conventional large scale printing equipment and methodology, to produce the sensor system capable of presumptively identifying, for example, gunshot residue on surfaces.

Embodiments of the present disclosure further provide a method of using the sensor system capable of presumptively identifying for example, gunshot residue on surfaces. A wetted swab can be used to transfer for example, gunshot residue from a surface, to the sensor system. The sample swab and sensor can be contacted, rubbed and all chemicals mixed to facilitate a presumptive colorimetric indication in the presence of reactive chemicals and dyes and for example, gunshot residue.

Current Methods and Techniques

Printing reactive chemicals, chromic dyes and stains to produce sensor devices has been practiced for decades and has advanced in recent times with a better understanding in the chemistry and interactions of ink formulations with reactive chemicals and dyes. Advances in precision printing equipment and methodology has also improved sensor development.[1][2]

Many problems exist in relation to successfully printing a reactive chemicals and dye's to a substrate, for use as a sensor device. The ink formulations for the most part utilise hazardous chemicals, combustible polymers and solvents, and the industry as a whole produces large volumes of hazardous waste, which has significant environmental impact risks. In particular, the "inks" used, are hazardous and the use of inks presents occupational health issues and the disposal of inks poses significant environmental risks. [3][4] Many of the ink formulations and equipment utilised for printed material curing, degrade the reactive chemicals and dye's required for colorimetric sensors.

There are three main categories of inks used on printing: [3][4]

1. Solvent-Based Inks
   a. Dry by evaporation—quick to dry, perform well, and allow printers a wide choice of products.
   b. Primarily volatile organic compounds (VOCs), which have caused concerns for health and safety.
   c. Very flammable.
   d. Contribute to the formation of ground-level ozone, which is a component of smog and causes respiratory and other health problems.
2. Water-Based Inks
   a. The primary solvent in water-based inks is water.
   b. Less flammable.
   c. Fewer environmental concerns.
   d. Dry by evaporation—longer to dry.
   e. Harder to use.
   f. Water-based inks may contain varying percentages of organic solvents and VOCs.
3. Ultraviolet-Cured Inks
   a. New ink technology.
   b. Rapid drying—they are cured through chemical reactions rather than drying through evaporation.
   c. Do not contain traditional organic solvents (No VOC).
   d. Do contain many chemicals that have not been tested comprehensively for environmental, health, and safety impacts.

The solvent provides fluidity, which allows the ink to be transported from mixing pot to the substrate, via the printing equipment. The resin causes the ink to adhere to the substrate, and finally, the presence of additives, if required, modify the physical properties of the inks.

As well as the associated hazards with solvents and resins, when printing a sensor device, it is of critical importance that both the solvent, resin and additives, do not react with or inhibit the reactive chemicals and dyes, required for sensor activity. Finally, once the wet ink product has been printed to the substrate, it must be dried producing the finished article. Drying or curing, also has the potential to destroy or greatly degrade the properties of the reactive chemicals and dye's.

Methods of cure such as Ultra Violet or Electron Beam radiation cannot be used, as these processes require energy, to initiate polymerisation of monomeric resin units into the dry cured polymeric film we associate with a finished product. This same radiation is more than sufficient to destroy most reactive chemicals and dye's, used in sensor development. As such UV resins are generally excluded from the sensor manufacture process. This leaves solvent and water based ink formulations as the core carrier for sensor development.

All solvents and resins have a varying degree of hazard, flammability and toxicity. This must be weighed and balanced against the properties required to produce a simple to use, mass produced sensor article.

A number of disclosures identify the potential of fire and explosion when using solvent based inks. This fire potential arises when volatile organic compound (VOC) vapors, produced by evaporation during the air drying phase, accumulate in or around machinery hot spots and electrical junctions and exceed the lower explosive limit (LOL) of the gas.

U.S. Pat. No. 5,407,708B1 discloses food packaging printing, utilising UV cure water based inks as a way of mitigating fire hazard and reducing VOC due to conventional solvent based inks.

US 2006/0075908A1 and U.S. Pat. No. 5,463,951A both disclose engineering modifications of equipment as a method to mitigate the fire and explosion hazards associated with involved with rapid drying and evaporation of volatile ink components.

U.S. Pat. No. 4,208,965A discloses high corona value and static discharge from wear and tear in machinery and printed article, igniting volatile vapors in conventional solvent based printing inks.

Other disclosures describe methods of printing workable sensors, however they have not considered the safety aspect of solvent and/or thinners and resin fire potential. For example, U.S. Pat. No. 9,759,7331B1 and U.S. Pat. No. 9,989,473B2 both disclose simple to use, mass produced printed sensor devices which detect a range of analyte compounds. They do however fail to identify the thinners and solvents utilised and improvements or engineering modifications to equipment which mitigate the risk of fire potential and/or a selection of the types of solvents which greatly reduce and/or remove the risk of fire during manufacture.

While the above examples of printed sensor development, other disclosures present methodology and chemical formulary which fails to achieve this claim. By way of example and without limitation the following disclosure fails in practise, unable to withstand the rigors of formulation chemistry, full scale manufacture and packaging. AU 2012904852 claims to provide a method of printing reactive chemicals onto paper utilizing flatbed horizontal screen printing. The description is vague and fails to provide any detail or example of ink formulation in relation to the choice of reactive chemicals and does not consider solvent and resin fire potential. For example, the disclosure fails to:
   a. Provide suitable solvent/resin/reactive chemical combinations which are complimentary and capable of producing a workable sensor device. Instead the reagents chosen conflict chemically, will degrade during mixing and storage.
   b. Degradation of the fiber matrix in the solid support is likely, destroying the final sensor article.

c. The solvent combinations are highly hazardous, combustible and corrosive to equipment.

d. The reagent combinations are hygroscopic and do not promote drying of final article and act to destroy the over print varnish consistency, due to ever increasing percentage of atmospheric moisture ingress during horizontal flat be screen printing.

e. The chemicals chosen destroy the screen blocking agents, which leach out into the printed paper product.

f. High resistance UV cure blocking agents.

Methods and Techniques Provided Herein

The information above is presented for purposes of illustration and description, but is not intended to be exhaustive or limited. In summary the following points have been high-lighted.

1. Ink formulary is required in sensor development in print manufacture.

2. Three main categories of inks exist.
   a. Organic solvent based inks.
   b. Water based inks.
   c. UV cure polymer inks.

3. The chemical properties of reactive chemicals and dyes used in sensor development are often destroyed by the UV cure process and so UV cure polymer inks are generally not used.

4. Solvents/thinners and resins used in solvent and water based inks must not react and/or degrade the reactive chemicals and dyes used in sensor development.

5. Solvents/thinners and resins used in solvent and water based inks possess many hazards including but not limited to toxicity and flammability.

6. Waste generation

7. Hazardous waste generators are subject to one of three sets of requirements, depending on the volume of hazardous waste generated: [3]

a. Large Quantity Generators (LQG) generate greater than 1000 kg (approximately 2200 lbs) of hazardous waste per month or greater than 1 kg (2.2 lbs) of acutely hazardous waste per month.

b. Small Quantity Generators (SQG) generate between 100 kg (approx. 220 lbs.) and 1000 kg (approx. 2200 lbs.) of hazardous waste per month and less than 1 kg of acutely hazardous waste per month.

c. Conditionally Exempt Small Quantity Generators (CESQG) generate no more than 100 kg (approx. 220 lbs.) of hazardous waste per month and less than 1 kg (2.2 lbs.) of acutely hazardous waste per month.

As well as engineering and mechanical modifications which mitigate fire potential and minimize waste stream production of solvents, thinners and resins, there is also a clear need for improved solvent, thinner and resin selection which achieves mitigation of toxic organic waste generated in sensor development and greatly reduces the fire risk during sensor print manufacture. This selection of improved solvents, thinners and resins will also allow better choice of printing equipment available for sensor development.

As disclosed herein, the described features, structures, or characteristics of the disclosed embodiments may be combined in any suitable manner in one or more embodiments. In the following description, numerous specific details are provided to provide a thorough understanding of embodiments of the disclosure. One skilled in the relevant art will recognize, however, that the disclosed embodiments can be practiced without one or more of the specific details, or with other methods, components and so forth. In other instances, well-known structures, materials, or operations are not shown or described in detail to avoid obscuring aspects of the disclosed embodiments.

Solvent and Water Based Ink Formulation Described Herein

Referring to solvent and water based ink formulation, a solvent and a resin must be chosen. It may provide: (1) reduced fire potential, (2) reduced environmental impact, and/or (3) minimal interaction and degradation of reactive chemicals and dyes.

Flammability Index for Ink formulations:[3] Rating of most solvent based ink is 3, and water based inks 0-3.[3][4]

0—Material that will not burn.

1—Material that must be pre-heated before who ignition and whose flashpoint exceeds 200F (93.4° C.), as well as most ordinary combustible materials.

2—Material that must be moderately heated before who ignition and that readily give off ignitable vapors.

3—Flammable liquids and materials that can be easily ignited under almost all normal temperature conditions, water may be ineffective in controlling or extinguishing fires in such materials.

4—Flammable gasses, pyrophoric liquids and flammable liquids. The preferred method of fire attack is to stop flow or protect exposure while fire burns itself out.

Figure 2:
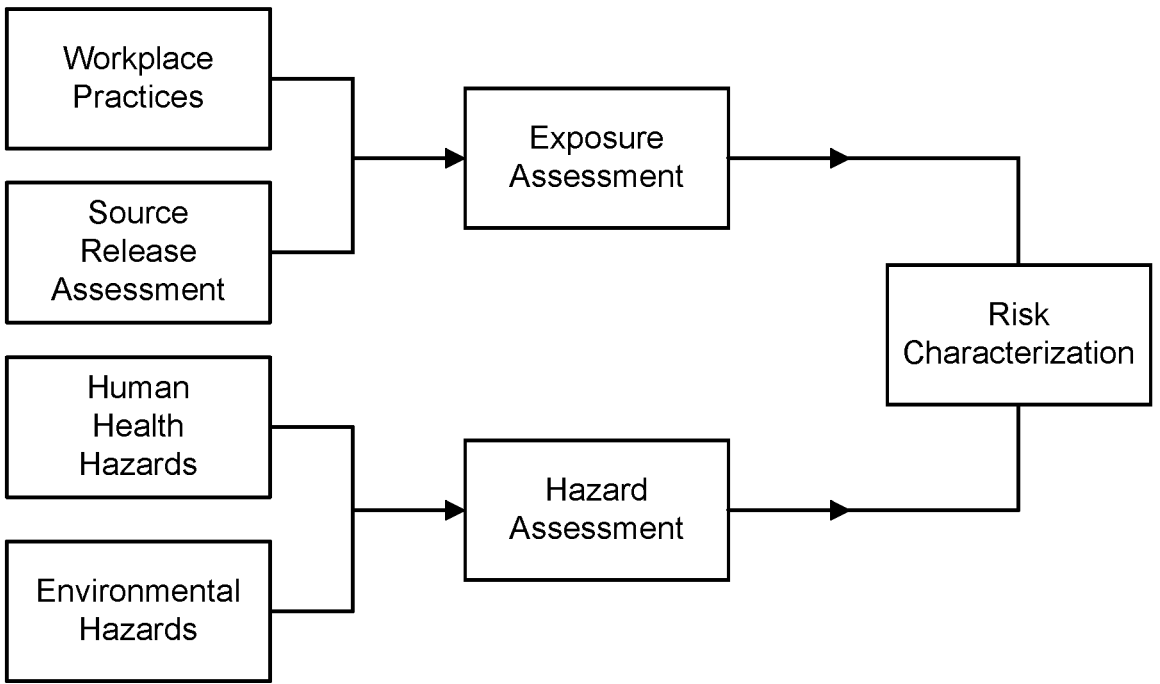
FIG. 2 illustrates a workplace hazard/risk flow chart.[3]

No ink system, free of human health risks and safety hazards is currently available. It will be a trade-off between the hazards, associated risk and suitability with reactive chemicals and dyes required for sensor development. In every system. Mitigation of Environmental and Worker Health associated hazards when using both solvent and water based ink formulations cannot be achieved through selection of chemicals in isolation. Selection of the chemical must be incorporated into a broader workplace practices which consider Job Safety Analysis, Safe Work Method Statements, Hazard Analysis and Risk Assessment. See, for example, FIG. 2 and Table 1 below (Ink use and Workplace hazard reduction.).

TABLE 1

| Ink use and Workplace hazard reduction. [3] | | | |
|---|---|---|---|
| Suggestion | Printers | Formulators | Other (Technology Assistance Providers, Colleges, etc.) |
| Read flexographic CTSA materials to become familiar with environmental and health impacts of chemicals in inks. | X | X | X |
| Select the cleanest inks that make business sense. Minimize use of hazardous inks. | X | | |

TABLE 1-continued

Ink use and Workplace hazard reduction. [3]

| Suggestion | Printers | Formulators | Other (Technology Assistance Providers, Colleges, etc.) |
|---|---|---|---|
| Minimize the need for and use of press-side solvents and other additives. | X | X | |
| Maximize good ventilation, particularly in the prep and press rooms. | X | | |
| Ensure that all workers who handle inks wear butyl or nitrile gloves, to minimize exposure to chemicals. | X | | |
| Ensure that all pollution control devices are maintained properly and work correctly at all times. | X | | |
| Identify ways to improve operations and environmental performance by looking at all steps in the printing process throughout the facility. | X | | X |
| Develop comprehensive safe working policies and practices for inks, and ensure that workers follow them. | X | | X |
| Minimize the amount and number of hazardous ingredients in inks. | | X | |
| Work to make environmental and health information about inks more accessible and understandable. | | X | |
| Support research on untested and inadequately tested flexographic ink chemicals, especially those with clear or potential risk concerns and those that are produced in high quantities (high production volume chemicals). | X | X | X |

Many solvents with reduced risk have been identified, including but not limited to: Acrylated polyols, acrylated polymers, acrylic acid polymers, ethylene glycol ethers, polyol derivatives, propyleneglycol ethers, Organotitanium compounds. Acrylic acid-butyl acrylate-methyl methacrylate styrene polymer 27306-39-4, Butyl acrylate-methacrylic acid-methyl methacrylate polymer 25035-69-2, Ethanol 64-17-5, isobutanol 78-83-1, isopropanol 67-63-0, propanol 71-23-8, etramethyldecyndiol 126-86-3, Alcohols, C11-15-secondary, ethoxylated 68131-40-8, Butyl carbitol 112-34-5, Ethoxylated tetramethyldecyndiol 9014-85-1, Ethyl carbitol 111-90-0, Polyethylene glycol 25322-68-3, Paraffin wax 8002-74-2, Dioctyl sulfosuccinate, sodium salt 577-11-7, Methylenedisalicylic acid 27496-82-8, Titanium isopropoxide 546-68-9, Dipropylene glycol methyl ether 34590-94-8, propylene glycol methyl ether 107-98-2, Propylene glycol propyl ether 1569-01-3.

The term "solvent," as used herein, includes its ordinary and customary meaning and further includes a liquid solvent in either aqueous or non-aqueous forms. The selection of the solvent depends notably on the solubility of the composition on said solvent and on the mode of administration. Aqueous solvent may be solely water, or may include water plus one or more miscible solvents, and may contain dissolved solutes such as sugars, buffers, salts or other excipients. The more commonly used non-aqueous solvents are the short-chain organic alcohols, such as, methanol, ethanol, propanol, short-chain ketones, such as acetone, and poly alcohols, such as glycerol.

Many resins with reduced risk have been identified, including but not limited to: Fatty acid, dimer-based polyamide, Fatty acids, C18-unsaturated. dimers, polymers with ethylenediamine, hexamethylenediamine, and propionic acid 67989-30-4, Resin acids, hydrogenated, methyl esters, Resin acrylic, Rosin, fumarated, polymer with diethylene glycol and pentaerythritol, Rosin, fumarated, polymer with pentaerythritol 68152-50-1, 2-propenoic acid, ethenylbenzene, and (1-methylethylenyl)benzene, rosin, polymerized 65997-05-9.

In accordance with embodiments of the present disclosure, an ink mixture is provided that includes a reactive chemical or dye, a co-solvent, and a resin. The co-solvent and resin can be chosen to reduce fire and environmental impact risk, while providing a fluid matrix for the reactive chemicals and dyes. The ink mixture can be printed safely onto a substrate, using a printing machine, to produce a printed sensor system, capable of producing a presumptive colorimetric indication in the presence of for example, gunshot residue, collected from a surface with a swab. A method of using a kit include the sensor system and swab and method of fabricating a kit including the device and swab for transport are discussed herein.

In accordance with embodiments of the present disclosure, a solvent system can be a co-solvent. The co-solvent can include aqueous and organic components, and can be configured to reduce fire risk and have minimal environmental impact. Without limitation a suitable co-solvent system can include water and isopropyl alcohol. In further embodiments, the co-solvent can include water and isopropyl alcohol in a ratio of 50:50 by weight or volume.

In accordance with embodiments of the present disclosure, the co-solvent system can act to reduce the fire and environmental impact risk due to the presence of water.

In accordance with embodiments of the present disclosure, the co-solvent can minimizes interaction with and degradation of the reactive chemicals and dyes which provide the presumptive colorimetric indication.

In accordance with the current invention the resin can reduce both fire and environmental impact risk. Examples of the resin can include, but are not limited to, cellulose, polyvinyl alcohol (PVA) and polyvinylpyrollidone (PVP). An exemplary choice is PVA.

In accordance with the current invention, the resin minimizes interaction with and degradation of the reactive chemicals and dyes which provide the presumptive colorimetric indication.

In accordance with the current invention, the co-solvent adequately solubilizes the solid resin compound, allowing the ink mixture to both solubilize and/or disperse the reactive chemicals and dyes in such a way as to produce a homogenized ink solution. Beneficially, the homogenized ink solution can be capable of being applied into many types of conventional large scale printing machines including but not limited to letterpress, rotary gravure, rotary screen printing, flat screen printing, tampography, wax printing, contact dosing, ultrasonic sputter, flexographic, spray, or drop on demand printing, to produce the printed sensor system capable of developing a presumptive colorimetric indication in the presence of, for example, for example, gunshot residues.

In accordance with embodiments of the present disclosure, the reactive chemicals and/or dyes can include, but are not limited to include n-1 naphthyl ethylenediamine dihydrochloride, nano or powdered zinc, sulfamic acid, sulfanilamide.

In accordance with embodiments of the present disclosure, a method of fabricating the sensor system is provided. The reactive chemical, n-1 naphthyl ethylenediamine dihydrochloride, is mixed with the co-solvent and the resin in a ratio of about 10:60:30), homogenized with mechanical shaking or mixing to produce an homogenized fluid ink ready for application printing onto a substrate using a flat bed or rotary screen or flexographic printing system.

In accordance with embodiments of the present disclosure, a method of producing the sensor system is provided in which the printed reactive chemical is dried by heated air flow. Exhaust gases can be removed with HVAC gas removal. Scrubber removal of at least one of $NO_x$, $CO_x$, or fume can also be performed.

In accordance with embodiments of the present disclosure, a method of producing a sensor system is also provided. The reactive chemical, sulfamic acid, is mixed with the co-solvent and the resin in a ratio of about 6:70:24), homogenized with mechanical shaking or mixing to produce an homogenized fluid ink ready for application printing onto a substrate using a flat bed or rotary screen or flexographic printing system.

In accordance with embodiments of the present disclosure, a method of producing the sensor system is provided. The printed reactive chemical can be dried by heated air flow and all exhaust gases removed with HVAC gas removal. Scrubber removal of at least one of $NO_x$, $CO_x$, or fume can also be performed.

In accordance with embodiments of the present disclosure, a method of producing the sensor system is provide in which the reactive chemicals, powdered zinc and sulfanilamide, are mixed with the co-solvent and the resin in a ratio of about 2:8:70:20, homogenized with mechanical shaking or mixing to produce an homogenized fluid ink ready for application printing onto a substrate using a flat bed or rotary screen or flexographic printing system.

In accordance with embodiments of the present disclosure, a method of producing the sensor system are provided in which the printed reactive chemical is dried by heated air flow and all exhaust gases removed with HVAC gas removal. Scrubber removal of at least one of $NO_x$, $CO_x$, or fume can also be performed.

In accordance with the embodiments of the present disclosure a method of producing the sensor system is provided in which the consecutive printed and dried reactive chemical zones are separated from one another, as shown in FIG. 1.

In accordance with embodiments of the present disclosure, and without limitation, the method of producing the sensor system, may further include guillotine or stamp cutting or shaping the solid support sensor system into a final design. As an example, and without limitation, the shape of the sensor system can be a strip. The solid support composition and dimensions and shape of the final device design are limited only by end user requirements.

In accordance with embodiments of the present disclosure, a method for packaging said sensor device strip is provided. The method can include hermetically sealing the sensor system (e.g., in a strip form) inside a container (e.g., a moisture and UV protective packet). The container can be composed of, for example, PET12 um/AL7 um/PE50.

In accordance with embodiments of the present disclosure, and without limitation, the method of producing the sensor system, may also include pre-wetting the swab with a liquid (e.g., with water) and hermetically sealing the pre-wetted swab inside a container (e.g., a moisture and UV protective packet). The container can be composed of, for example, PET12 um/AL7 um/PE50.

In accordance with embodiments of the present disclosure, and without limitation, there is provided a method for using the sensor system which is capable of identifying, by way of presumptive colorimetric indication, for example, gunshot residue. The method can include removal of the pre-wetted swab and sensor system from its packaging. The method can also include identifying a gunshot residue sample surface. The method can further include rubbing the identified surface with the swab. The method can further include transferring the sampled swab to the sensor system and rubbing the sampled swab into printed reactive chemical test zones on the surface of the sensor system for a predetermined time period (e.g., one to several seconds) to facilitate a presumptive colorimetric indication for post blast gunshot residue.

The description of the present disclosure has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the disclosed embodiments for various embodiments with various modifications as are suited to the particular use contemplated.

The abbreviations used herein have their conventional meanings within the chemical and biological arts.

While various embodiments and aspects of the disclosure are shown and described herein, it will be obvious to those skilled in the art that such embodiments and aspects are provided by way of example only. Numerous variations, changes, and substitutions will now occur to those skilled in the art without departing from the disclosed embodiments. It should be understood that various alternatives to the embodiments described herein may be employed.

The section headings used herein are for organizational purposes only and are not to be construed as limiting the subject matter described. All documents, or portions of documents, cited in the application including, without limitation, patents, patent applications, articles, books, manuals, and treatises are hereby expressly incorporated by reference in their entirety for any purpose.

Unless defined otherwise, technical and scientific terms used herein have the same meaning as commonly understood by a person of ordinary skill in the art. See, e.g., Singleton et al., DICTIONARY OF MICROBIOLOGY AND MOLECULAR BIOLOGY 2nd ed., J. Wiley & Sons (New York, NY 1994); Sambrook et al., MOLECULAR CLONING, A LABORATORY MANUAL, Cold Springs Harbor Press (Cold Springs Harbor, NY 1989). Any methods, devices and materials similar or equivalent to those described herein can be used in the practice of this the disclosed embodiments. The following definitions are provided to facilitate understanding of certain terms used frequently herein and are not meant to limit the scope of the present disclosure.

The transitional term "comprising," which is synonymous with "including," "containing," or "characterized by," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the disclosed embodiments.

In the descriptions herein and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

It is understood that where a parameter range is provided, all integers within that range, and tenths thereof, are also provided by the disclosed embodiments. For example, "0.2-5 mg" is a disclosure of 0.2 mg, 0.3 mg, 0.4 mg, 0.5 mg, 0.6 mg etc. up to and including 5.0 mg.

As used in the description herein and throughout the claims that follow, the meaning of "a," "an," and "the" includes plural reference unless the context clearly dictates otherwise.

Other Embodiments

While the disclosed embodiments have been described in conjunction with the detailed description thereof, the foregoing description is intended to illustrate and not limit the scope of the disclosure, which is defined by the scope of the appended claims. Other aspects, advantages, and modifications are within the scope of the following claims.

The patent and scientific literature referred to herein establishes the knowledge that is available to those with skill in the art. All references, e.g., U.S. patents, U.S. patent application publications, PCT patent applications designating the U.S., published foreign patents and patent applications cited herein are incorporated herein by reference in their entireties. Genbank and NCBI submissions indicated by accession number cited herein are incorporated herein by reference. All other published references, documents, manuscripts and scientific literature cited herein are incorporated herein by reference. In the case of conflict, the present specification, including definitions, will control. In addition, the materials, methods, and examples are illustrative only and not intended to be limiting.

While embodiments of the disclosure have been particularly shown and described with references to preferred embodiments thereof, it will be understood by those skilled in the art that various changes in form and details may be made therein without departing from the scope of the invention encompassed by the appended claims.

REFERENCES

Each of the following references are incorporated by reference in their entirety.

Patent Documents

US 2006/0075908A1 Apparatus for printing objects of the tablet type, in particular medical tablets and process therefore U.S. Pat. No. 5,463,951A Printing machine spray device AU 2012904852 Screen printing process for reactive chemicals U.S. Pat. No. 5,407,708B1 Method and apparatus for applying radiation curable inks in a flexographic printing system U.S. Pat. No. 4,208,965A Method for electrostatic assistance in printing processes, and printing machines having electrostatic substrate contact pressure.

U.S. Pat. No. 9,759,733B1 Mass produced, low cost, portable test kit for the detection and identification of narcotics.

U.S. Pat. No. 9,989,473B2 Portable liquid analyser.

OTHER REFERENCES

[1] Vecera, M. and Gasparic, J. Detection and identification of organic compounds. PLENUM PRESS. New. 1971. ISBN-13: 978-1-4684-1835-4 e-ISBN-13: 978-1-4684-1833-0

[2] Sabnis, R. Handbook of biological dyes and stains synthesis and industrial applications. 2010 by John Wiley & Sons. ISBN: 978-0-470-40753-0

[3] Flexographic Ink Options: A Cleaner Technologies Substitutes Assessment. Design for the Environment Program Economics, Exposure, and Technology Division Office of Pollution Prevention and Toxics (7404) U.S. Environmental Protection Agency. February 2002 EPA 744-R-02-001A.

[4] Flexographic Ink Options: A Cleaner Technologies Substitutes Assessment, volume 2. Design for the Environment Program Economics, Exposure, and Technology Division Office of Pollution Prevention and Toxics (7404) U.S. Environmental Protection Agency. February 2002 EPA 744-R-02-001B.

What is claimed is:

1. A sensor system consisting of, a solid support; and an ink printed on a surface of the solid support, the ink consisting of:

a reactive chemical or dye, wherein the reactive chemical or dye is selected from the group consisting of n-1 naphthyl ethylenediamine dihydrochloride, nano or powdered zinc, sulfamic acid, sulfanilamide and any combination thereof; and a resin; and wherein the reactive chemical or dye is configured to undergo a chemical reaction with gunshot residue that produces a presumptive colorimetric indication.

2. The sensor system of claim 1, wherein the ink is present on the surface of the solid support and spaced apart from any other ink.

3. The system of claim 1, wherein the solid support is formed from a material selected from the group consisting of glass, metal, paper, textiles, organic membranes, and inorganic membranes.

4. The sensor system of claim 1, wherein the resin is selected from the group consisting of cellulose, polyvinyl alcohol (PVA), or polyvinylpyrollidone (PVP).

5. The sensor system of claim 1, wherein the resin is PVA.

6. The system of claim 1, wherein the resin minimizes interaction with and degradation of the reactive chemical or dye which provide the presumptive colorimetric indication.

7. The sensor system of claim 1, wherein the reactive chemical or dye is n-1 naphthyl ethylenediamine dihydrochloride and a ratio of the reactive chemical or dye with the resin is 10:30.

8. The sensor system of claim 1, wherein the reactive chemical or dye is sulfamic acid and a ratio of the reactive chemical or dye and the resin is 6:24.

9. The sensor system of claim 1, wherein the reactive chemical or dye is powdered zinc and sulfanilamide, and a ratio of the reactive chemical or dye with the resin is 2.8:20.

10. A kit comprising:

the sensor system of claim 1;

a swab pre-wetted with a liquid;

a container that hermetically seals the sensor system and the pre-wetted swab in respective compartments that are separated from one another.

11. The kit of claim 10, wherein the swab is pre-wetted with water.

* * * * *